G. G. GRIFFIN.
APPARATUS FOR MAKING CONFETTI.
APPLICATION FILED AUG. 8, 1911.
1,040,935.
Patented Oct. 8, 1912.
3 SHEETS—SHEET 1.
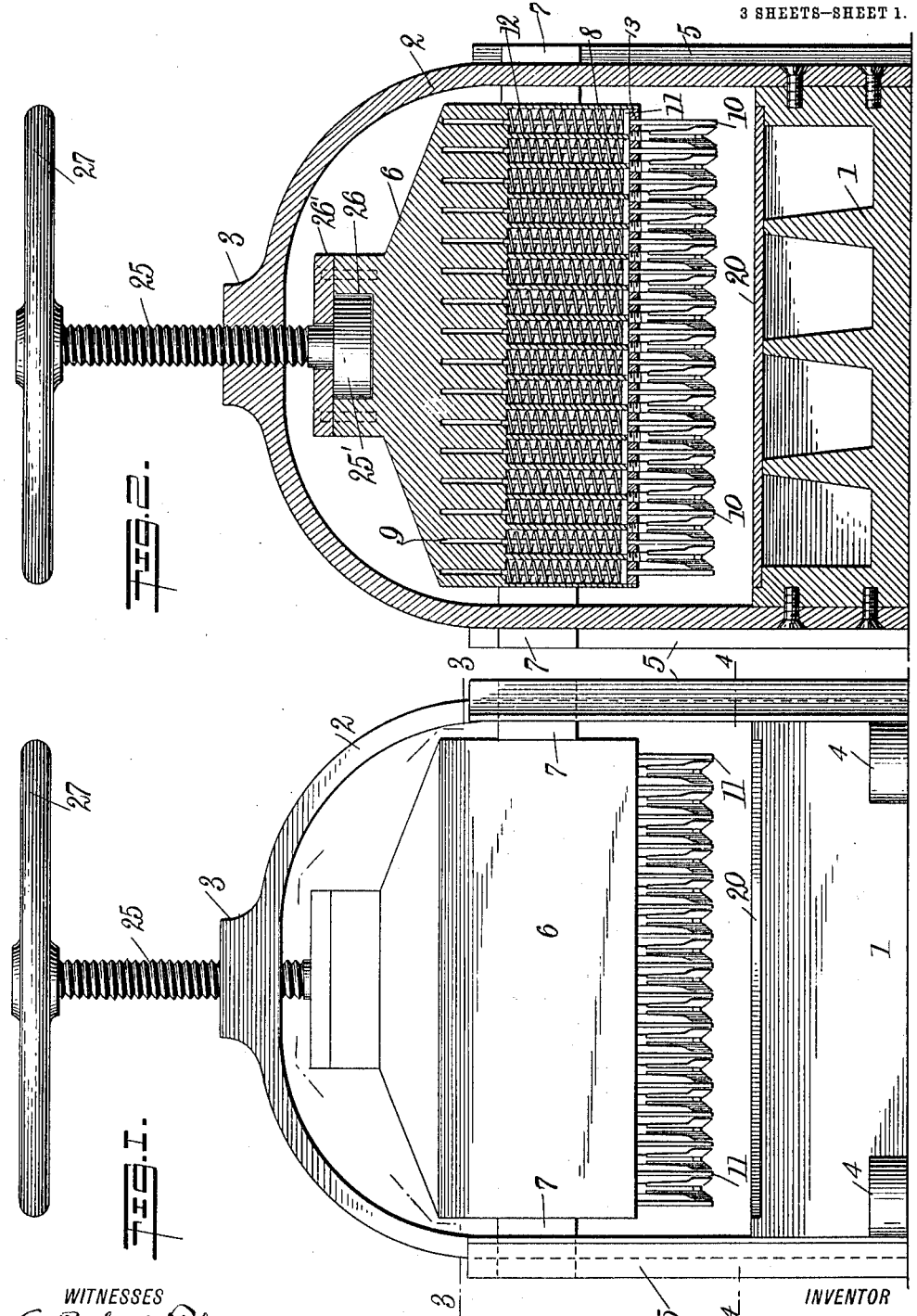
WITNESSES
G. Robert Thomas
Wm. F. Nickel
INVENTOR
Gerald G. Griffin
BY Munn & Co.
ATTORNEYS G. G. GRIFFIN.
APPARATUS FOR MAKING CONFETTI.
APPLICATION FILED AUG. 8, 1911.
1,040,935.
Patented Oct. 8, 1912.
3 SHEETS—SHEET 2.
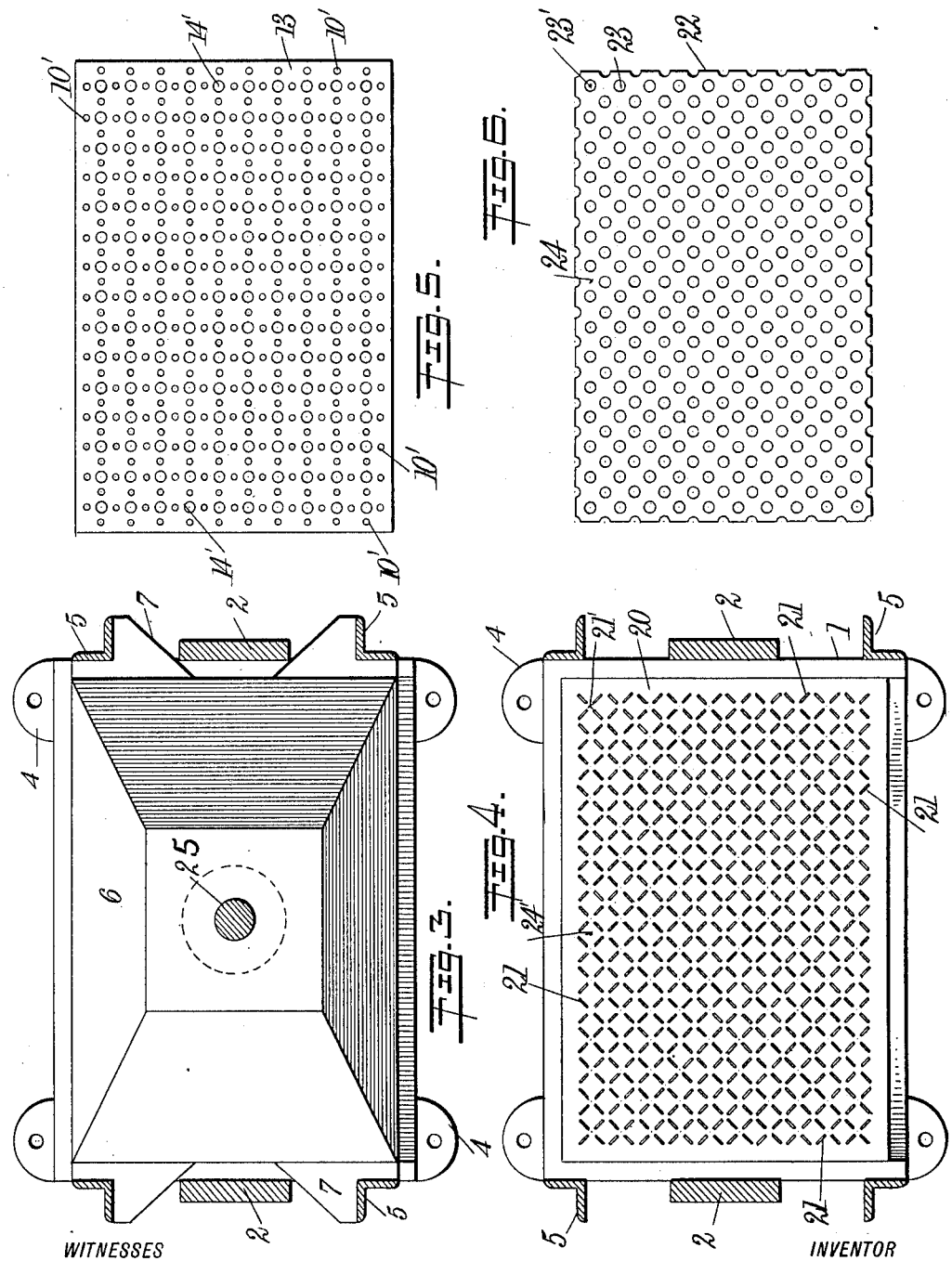
WITNESSES
G. Robert Thomas
Wm. F. Nickel
INVENTOR
Gerald G. Griffin
BY
ATTORNEYS

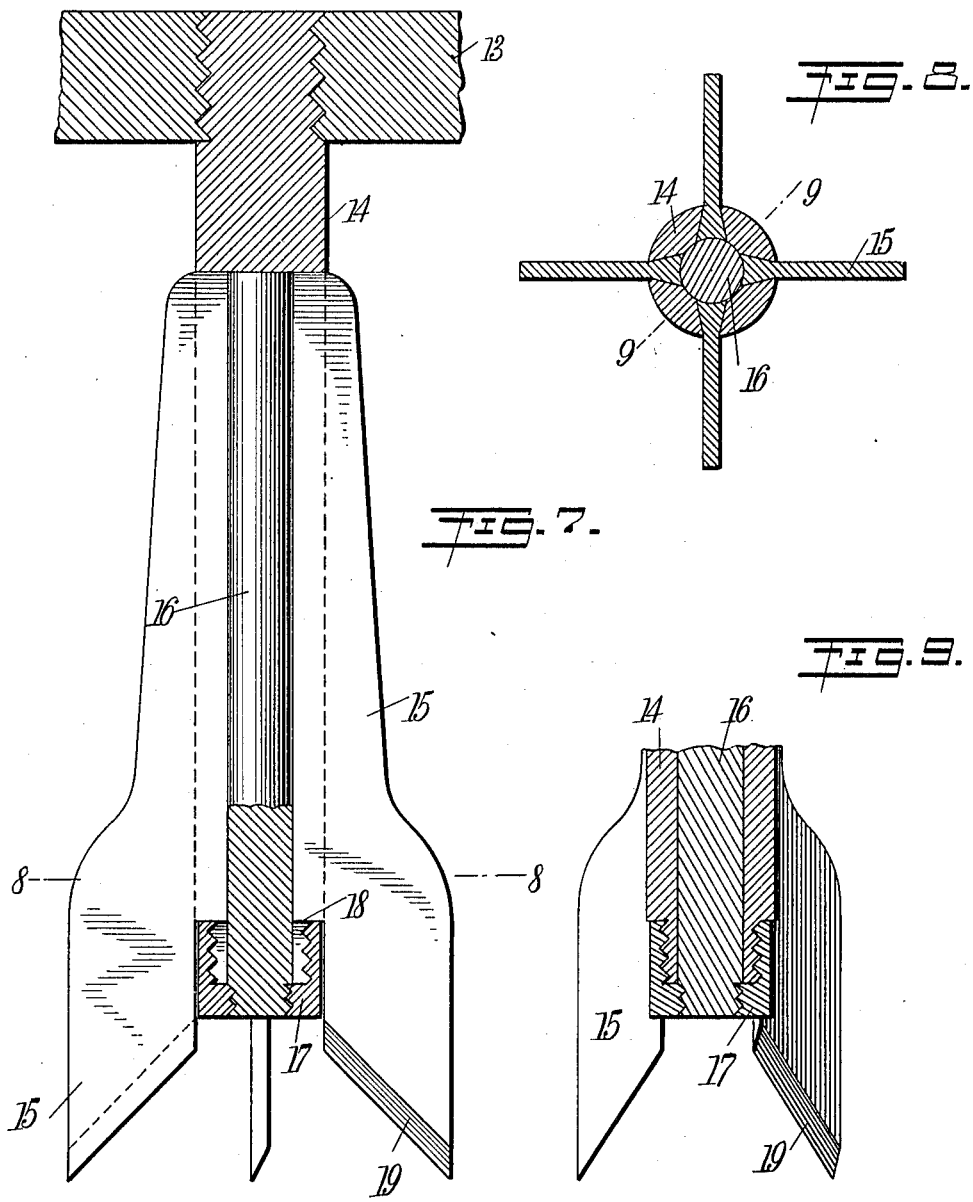

UNITED STATES PATENT OFFICE.

GERALD G. GRIFFIN, OF NEW YORK, N. Y.

APPARATUS FOR MAKING CONFETTI.

1,040,935.

Specification of Letters Patent.  Patented Oct. 8, 1912.

Application filed August 8, 1911. Serial No. 642,981.

*To all whom it may concern:*

Be it known that I, GERALD G. GRIFFIN, a citizen of the United States, and a resident of the city of New York, borough of the Bronx, in the county and State of New York, have invented a new and Improved Apparatus for Making Confetti, of which the following is a full, clear, and exact description.

My invention relates to a new and improved machine for making confetti by cutting up a sheet of paper or cardboard having perforations therethrough arranged in rows. The perforations may have various shapes, and when the paper is cut up, it is divided along lines joining the centers of the perforations of each row which extends in one direction and other lines at certain angles thereto.

My invention also comprises a movable head or casting having a number of knives mounted therein to cut up a sheet of perforated material; and suitable plungers for holding the material in position when the cutting operation is in progress.

Reference is to be had to the accompanying drawings forming a part of this specification, in which the same characters of reference indicate the same parts in all the views.

Figure 1 is a side view of a cutting device by means of which my improved process is carried into execution; Fig. 2 is a vertical section of the means shown in Fig. 1; Fig. 3 is a horizontal section on the line 3—3 of Fig. 1; Fig. 4 is a horizontal section on the line 4—4 of Fig. 1; Fig. 5 is a plan of the spacing plate which supports the cutter knives, and through which the retaining plungers pass; Fig. 6 is a view of a sheet of material to be worked, showing the rows of perforations diagonally arranged therein; Fig. 7 is an enlarged vertical section of one of the cutter knives; Fig. 8 is a horizontal section on the line 8—8 of Fig. 7; and Fig. 9 is a vertical sectional view on the line 9—9 of Fig. 8.

On the drawings, the cutting machine by means of which I make confetti by dividing up a sheet of perforated material is shown as being provided with a base 1, to which a yoke 2 is joined at its lower ends. This yoke 2 has a central internally-threaded boss 3; and the base 1 has a number of lugs 4, preferably four, one at each corner, to facilitate bolting the cutting machine to a floor or platform. To the base are also joined adjacent the corners thereof, angle-shaped upright guides 5, to control the movements of a head or casting 6. This head or casting 6 has shoes 7 at its corners, which fit the guides 5, so that the head can slide up and down along the same. The head 6 has a number of bores 8 formed in its lower surface, these bores being arranged in a number of straight diagonal rows, and having their ends terminating in reduced extensions 9. These extensions 9 receive plunger rods 10, each of these rods having a collar 11 thereon to engage a spring 12 contained in the bore 8, to hold the plunger rod in extended position. The lower ends of the bores 8 are closed by means of a plate 13, this plate having a number of perforations 10′ therethrough, to give passage to the plunger rods 10, and permit these plunger rods to move up and down, owing to the fact that the springs 8 keep the collars 11 pressed yieldingly against the top surface of the plate 13.

The plate 13 is provided with a number of holes 14′, to receive a number of shanks 14, which support the cutter blades 15. The apertures 14′ are arranged in straight longitudinal and transverse rows, while the apertures 10′ are arranged in diagonal rows, so that each of the apertures 14 will be at the center, four equi-distant apertures 10′ surrounding it, as Fig. 5 clearly shows.

Each of the shanks 14 is made hollow for the greater portion of its length, and has slots formed therein to receive the cutter blades 15. These slots are preferably ninety degrees apart, and are so shaped that they widen inward, the backs of the cutter blades 15 being wedge-shaped, so that when they are slid into place from the lower end of the shank they cannot be displaced by being pulled out laterally. The lower end of the shank has a reduced threaded extension to receive an internally-threaded cap 17 on the end of a rod or stem 16. This rod or stem is inserted into the hollow portion of the shank 14; and when the cap 17 is screwed upon the threaded extension of the shank, the rod 16 is held in place. The rod keeps the blades 15 in extended position with respect to the shank 14; and the cap 17 engages the inner shoulders 18 adjacent the lower ends of the blades 15, and thus prevents the blades 15 from sliding longitudinally of the stem 14, and dropping out of the grooves.

Each of the blades 15 has a diagonal cutting edge 19 formed on its lower end, the outer end of each edge being in advance of the inner end, in the direction of the working movement of the blade; and these cutting edges are designed to pass freely through diagonal slots 21 formed in a plate 20 supported by the base 1 of the cutting machine. This plate receives a sheet of perforated material 22 having perforations 23 therein arranged in diagonal rows. When this sheet is laid upon the plate 20, the perforations 23 will lie at the center of each radiating group of slots 21. For example, the center 23' of one of the perforations on Fig. 6 will coincide with the dot 21' at the center of the radiating group of slots at the upper right-hand corner of the plate 20 shown on Fig. 4; and the centers of the other perforations in the plate 22 will occupy corresponding positions. The points 24 arranged in the center of each group of four perforations 23 in the plate 22 will coincide with points 24' on the plate 21 which lie between the radiating groups of slots; and these points 24' mark the engagement of the spring-pressed plunger rods 11 which hold the plate or sheet of material 22 in place when it is being cut up.

25 is an operating rod which is threaded and passes through the boss 3. It has a head 25' on its lower end, which is loosely received in a socket 26 in the top of the casting 6; and 26' is a perforated plate which closes the socket 26 and prevents the separation of the rod 25 and casting 6, while allowing the rod 25 to turn freely with respect to the casting. A hand-wheel 27 is secured on the outer end of the rod, so that, when the wheel 27 turns, the rod 25 turns, and the casting can be raised or lowered.

In operation, the sheet 22 is laid upon the plate 20, so that the perforations 23 will lie at the center of one of the radiating groups of slots 21. The wheel 27 will be turned to lower the head or casting 6, until the plunger rods 11 engage the sheet 22 at the points 24, these rods normally extending downward slightly below the ends of the cutter blades 15; and as the lowering of the head or casting 6 is continued, the springs 8 will permit the rods 11 to give slightly, the pressure of the springs on the rod serving to hold the sheet in proper position and prevent it from getting displaced. As the head or casting 6 continues its downward movement, the blades 15 cut the sheet 22 along diagonal lines between the perforations 23, passing through the sheet and through the slots 21. The head or casting 6 is now raised by turning the wheel 27 in the opposite direction, withdrawing the knives 15, the plunger 11 remaining in contact with the sheet 22 until the cutter knives are lifted above the same; and thus the pieces of paper into which the sheet is cut up are prevented from being displaced or bent, if they should tend to stick to the sides of the cutter knives when the latter are being lifted.

It is obvious that I may stamp perforations of almost any shape in the sheet 22, arranging them in several rows in the manner described. The perforations shown in Fig. 6 are circular, but I may make them square; or I may give them still other forms if desired.

While I have shown and described the above apparatus as designed chiefly for the manufacture of confetti, I may employ it for the manufacture of artificial flowers as well. To do so it would be only necessary to obtain a sheet 22 having perforations 23 therein of such a shape as to give a flower-like section when the sheet is divided by the knife blades 15, discarding such waste pieces as might of necessity result in arranging the perforations and the knife blades to cut out the sections of material for artificial flowers of the shape desired.

While the wheel 27 is shown and described as a hand-wheel, it is obvious that the threaded shank 25 may be operated by mechanical power or by foot power if desired.

It is to be understood that the plate 20 is movably supported by the base 1, to enable it to be taken out, either by sliding or lifting it off the base, in order to place a sheet of material to be cut up thereon or to remove the sections after the sheet has been divided by the knife blades in the manner above described. I prefer to arrange the plate 20 so that it can be removed by sliding, and to this end I provide the base 1 with raised edges on three sides, so that the operator can slide the plate into position from the fourth side, as shown in Fig. 4.

Having thus described my invention, I claim as new and desire to secure by Letters Patent:

1. Apparatus for making confetti, comprising a head or casting, a plurality of cutter elements projecting from one face of said casting, resilient means projecting from the same face of the head or casting beyond the ends of the cutter elements, said resilient means being interspersed among the cutter elements, and means for moving said head or casting toward a sheet of paper or cardboard, to cut said sheet into pieces of the proper size and shape, said resilient means engaging the material to be worked before and after cutting, to hold the sheet down while being cut, and to prevent the knives from displacing the pieces when they are being withdrawn after the cutting is finished.

2. Apparatus for making confetti, comprising a head or casting, a plurality of knives projecting from one face of said casting, a plurality of spring-pressed plungers projecting from the same face of the head or casting beyond the ends of the knives, said rods or plungers being interspersed among the knife blades, and means for moving said head or casting toward a sheet of paper or cardboard, to cut said sheet into pieces of the proper size and shape, said plungers engaging the material to be worked before and after cutting, to hold the sheet down while being cut, and to prevent the knives from displacing the pieces when they are being withdrawn after the cutting is finished.

3. Apparatus for manufacturing confetti, comprising a head or casting, guides in which the said head or casting is mounted to be moved, a plurality of knives carried by and projecting from one face of said casting, a plurality of spring-pressed plungers projecting from the said face of the casting beyond the ends of the knives, said plungers being interspersed among the knives, a guide plate having slots therein to receive the ends of the knife blades, and means for moving said casting toward said guide plate, whereby a sheet of paper or other material on said guide plate will be engaged by the plungers and severed into pieces of the proper size and shape by the knives, said plungers also serving to hold the pieces against displacement when the knives are withdrawn.

4. In apparatus for making confetti, a supporting member comprising a hollow shank having slots extending through its sides, said slots being wider adjacent their inner than adjacent their outer edges, a plurality of knife blades adapted to be received by said slots, said blades each having a shoulder and a diagonal cutting edge adjacent one end, said shank having a reduced screw-threaded extension adjacent the cutting edges of the blades, and a stem having an internally threaded cap to be inserted into said shank, to bring the cap into engagement with the screw-threaded extension and the shoulders of the knife blades, to hold the latter in place.

5. In apparatus for making confetti, a supporting member comprising a hollow shank having longitudinal slots in its sides, said slots being wider adjacent their inner than adjacent their outer edges, a plurality of knife blades adapted to be received by said slots, and means engaging the lower ends of said knife blades and said shank, to hold the knives in place in said shank.

6. Apparatus for making confetti, comprising a head or casting, a plurality of knives projecting from one face of said casting, said knives being arranged in groups, the members of which radiate from a common center, a plurality of spring-pressed plungers projecting from the same face of the head or casting beyond the ends of the knives, said rods or plungers being interspersed among said knives, and means for moving said head or casting toward a sheet of paper or cardboard, to cut said sheet into pieces of the proper size and shape, said plungers engaging the material to be worked before and after cutting, to hold the sheet down while being cut, and to prevent the knives from displacing the pieces when they are withdrawn after the cutting is finished.

7. Apparatus for manufacturing confetti, comprising a head or casting, guides in which the said head or casting is mounted to be moved, a plurality of knives carried by and projecting from one face of said casting, said knives being arranged in groups, the members of which radiate from a common center, a plurality of spring-pressed plungers projecting from the said face of the casting beyond the ends of the knives, said plungers being interspersed among the knives, a guide plate having slots therein to receive the ends of the knife blades, and means for moving said casting toward said guide plate, whereby a sheet of paper or other material on said guide plate will be engaged by the plungers and severed into pieces of the proper size and shape by the knives, said plungers also serving to hold the pieces against displacement when the knives are withdrawn.

8. Apparatus for manufacturing confetti, comprising a head or casting, guides in which the said head or casting is mounted to be moved, a plurality of knives carried by and projecting from one face of said casting, a plurality of resilient means projecting from the said face of the casting beyond the ends of the knives, said resilient means being interspersed among the knives, a guide plate having slots therein to receive the ends of the knife blades, and means for moving said casting toward said guide plate, whereby a sheet of paper or other material on said guide plate will be engaged by the resilient means and severed into pieces of the proper size and shape by the knives, said resilient means also serving to hold the pieces against displacement when the knives are withdrawn.

9. Apparatus for making confetti, comprising a head or casting, a plurality of knives projecting from one face of said casting, said knives being arranged in groups, the members of which radiate from a common center, a plurality of resilient means projecting from the same face of the head or casting beyond the ends of the knives, said resilient means being interspersed among said knives, and means for moving said head or casting toward a sheet of paper or cardboard, to cut said sheet into pieces of the proper size and shape, said resilient means engaging the material to be worked before and after cutting, to hold the sheet down while being cut, and to prevent the knives from displacing the pieces when they are withdrawn after the cutting is finished.

10. Apparatus for manufacturing confetti, comprising a head or casting, guides in which the said head or casting is mounted to be moved, a plurality of knives carried by and projecting from one face of said casting, said knives being arranged in groups, the members of which radiate from a common center, a plurality of resilient means projecting from the said face of the casting beyond the ends of the knives, said resilient means being interspersed among the knives, a guide plate having slots therein to receive the ends of the knife blades, and means for moving said casting toward said guide plate, whereby a sheet of paper or other material on said guide plate will be engaged by the resilient means and severed into pieces of the proper size and shape by the knives, said resilient means also serving to hold the pieces against displacement when the knives are withdrawn.

In testimony whereof I have signed my name to this specification in the presence of two subscribing witnesses.

GERALD G. GRIFFIN.

Witnesses:
 W. L. ORTON,
 PHILIP D. ROLLHAUS.

---

Copies of this patent may be obtained for five cents each, by addressing the "Commissioner of Patents, Washington, D. C."